(12) United States Patent
Dorin et al.

(10) Patent No.: US 8,923,660 B2
(45) Date of Patent: Dec. 30, 2014

(54) SYSTEM AND METHOD FOR AN OPTICAL PHASE SHIFTER

(71) Applicant: FutureWei Technologies, Inc., Plano, TX (US)

(72) Inventors: Bryce Dorin, Ottawa (CA); Winnie N. Ye, Ottawa (CA)

(73) Assignee: FutureWei Technologies, Inc., Plano, TX (US)

( * ) Notice: Subject to any disclaimer, the term of this patent is extended or adjusted under 35 U.S.C. 154(b) by 0 days.

(21) Appl. No.: 13/955,449

(22) Filed: Jul. 31, 2013

(65) Prior Publication Data

US 2014/0348460 A1    Nov. 27, 2014

Related U.S. Application Data

(60) Provisional application No. 61/827,400, filed on May 24, 2013.

(51) Int. Cl.
| | |
|---|---|
| *G02F 1/035* | (2006.01) |
| *G02F 1/01* | (2006.01) |
| *G02B 27/28* | (2006.01) |
| *G02F 1/225* | (2006.01) |

(52) U.S. Cl.
CPC .......... *G02F 1/2257* (2013.01); *G02F 1/0136* (2013.01); *G02B 27/286* (2013.01)
USPC ........... 385/3; 385/41; 385/45; 385/1; 385/14

(58) Field of Classification Search
CPC .... G02F 1/0136; G02F 1/2257; G02B 27/286
USPC ................... 385/1, 3, 11, 14, 41, 45
See application file for complete search history.

(56) References Cited

U.S. PATENT DOCUMENTS

| | | | |
|---|---|---|---|
| 6,671,437 B2 * | 12/2003 | Margalit | 385/40 |
| 6,947,619 B2 * | 9/2005 | Fujita et al. | 385/11 |

(Continued)

FOREIGN PATENT DOCUMENTS

| | | |
|---|---|---|
| CN | 102692680 A | 9/2012 |
| CN | 102763264 A | 10/2012 |

OTHER PUBLICATIONS

Fukuda, Hiroshi, et al., "Ultrasmall Polarization Splitter Based on Silicon Wire Waveguides," Optics Express, Dec. 11, 2006, vol. 14, No. 25, 8 pages.

(Continued)

*Primary Examiner* — Ellen Kim
(74) *Attorney, Agent, or Firm* — Slater & Matsil, L.L.P.

(57) ABSTRACT

In one embodiment, an optical phase shifter includes a first phase-shifter configured to phase shift a transverse electric (TE) component of an optical signal by a first phase-shift to produce a TE component of a first signal, and a transverse magnetic (TM) component of the optical signal by a second phase-shift to produce a TM component of the first signal. The optical phase-shifter includes a polarization-rotator configured to rotate the TE component of the first signal to produce a TM component of a rotated signal, and the TM component of the first signal to produce a TE component of the rotated signal. The optical phase-shifter includes a second phase-shifter configured to phase-shift a TE component of the rotated signal by a third phase-shift, and the TM component of the rotated signal by a fourth phase-shift, where the first phase-shifter, the polarization-rotator, and the second phase-shifter are integrated on a substrate.

20 Claims, 6 Drawing Sheets

(56) References Cited

U.S. PATENT DOCUMENTS

| | | | |
|---|---|---|---|
| 7,680,362 B2* | 3/2010 | Rasras | 385/11 |
| 7,899,279 B2* | 3/2011 | Nasu et al. | 385/14 |
| 2004/0008965 A1 | 1/2004 | Betty | |
| 2010/0104237 A1* | 4/2010 | Nasu et al. | 385/11 |
| 2010/0119189 A1* | 5/2010 | Nasu et al. | 385/1 |
| 2012/0243827 A1 | 9/2012 | Jeong | |

OTHER PUBLICATIONS

Dorin, B. et al., "Wavelength and Polarization Insensitive Optical Switch on SOI," Carleton University, Canada, Huawei Engage Project, Jan. 17, 2013, 21 pages.

Dorin, B. et al., "Polarization Insensitive Phase Shifters," Carleton University, Canada, Huawei Engage Project, May 2013; 3 pages.

Fukuda, H. et al., "Polarization rotator based on silicon wire waveguides," Optics Express 2628, vol. 16, No. 4, Feb. 18, 2008, 8 pages.

Wang, Z. et al., "Ultrasmall Si-nanowire-based polarization rotator," J. Opt. Soc. Am. B., vol. 25., No. 5, May 7, 2008, pp. 747-753.

Inoue, Y et al., "Elimination of Polarization Sensitivity in Silica-Based Wavelength Division Multiplexer Using a Polyimide Half Waveplate," IEEE Journal of Lightwave Technology, vol. 15, No. 10, Oct. 1997, pp. 1947-1957.

Kiyat, I. et al. "A Compact Silicon-on-Insulator Polarization Splitter," IEEE Photonics Technology Letters, vol. 17, No. 1, Jan. 2005, pp. 100-102.

Van Laere, F. et al., "Efficient Polarization Diversity Grating Couplers in Bonded InP-Membrane," IEEE Photonics Technology Letters, vol. 20, No. 4, Feb. 15, 2008, pp. 318-320.

International Search Report of Patent Cooperation Treaty (PCT), International Application No. PCT/US2014/078391, Applicant: Huawei Technologies Co. Ltd., date of mailing Sep. 3, 2014, 12 pages.

* cited by examiner

SYSTEM AND METHOD FOR AN OPTICAL PHASE SHIFTER

This application claims the benefit of U.S. Provisional Application Ser. No. 61/827,400 filed on May 24, 2013, and entitled "Polarization Independent Waveguide Optical Phase Shifter," which application is hereby incorporated herein by reference.

TECHNICAL FIELD

The present invention relates to a system and method for photonics, and, in particular, to a system and method for an optical phase shifter.

BACKGROUND

In some photonic devices, shifting the phase of an optical signal is desirable. Optical phase shifting may be used in optical modulators, switches, sensors, multiplexers, demultiplexers, and other devices. When light propagates through a media, it travels an optical path length that depends on the effective index of refraction of the media. The optical phase may be adjusted when light propagates through a media having a desired optical path length to adjust the optical phase.

Optical devices may be integrated in a photonic integrated circuit (PIC) containing optical waveguides. Optical waveguides are light conduits that contain a slab, strip, or cylinder of a dielectric material surrounded by another dielectric material having a lower refractive index. The light propagates along, and is confined to, the higher refractive index material through total internal reflection. In a PIC, the core may be silicon, surrounded by a lower refractive index material, such as silicon dioxide, silicon nitride, silicon oxynitride, and/or air. The waveguides may be a single mode or multi-mode waveguide. In an example, a PIC operates at a telecommunications wavelength, such as 1550 nm or 1310 nm. The light may be coupled into, out of, or between optical waveguides. In a PIC, multiple photonic functions are integrated on a substrate, such as silicon-on-insulator (SOI). PICs are used for optical communications, and for other applications, such as biomedical application sand photonic computing. PICs may provide increased functionality, while being compact, and enabling higher performance than discrete optical devices.

SUMMARY

An embodiment optical phase shifter includes a first waveguide phase shifter configured to phase shift a transverse electric (TE) polarized component of an input optical signal by a first phase shift to produce a TE polarized component of a first phase shifted optical signal, and configured to phase shift a transverse magnetic (TM) polarized component of the input optical signal by a second phase shift to produce a TM polarized component of the first phase shifted optical signal. The optical phase shifter also includes a first polarization rotator configured to rotate the TE polarized component of the first phase shifted optical signal to produce a TM polarized component of a rotated optical signal, and configured to rotate the TM polarized component of the first phase shifted optical signal to produce a TE polarized component of the rotated optical signal. Additionally, the optical phase shifter includes a second waveguide phase shifter configured to phase shift a TE polarized component of the rotated optical signal by a third phase shift to produce a TE polarized component of a second phase shifted optical signal, and configured to phase shift the TM polarized component of the rotated optical signal by a fourth phase shift to produce a TM polarized component of the second phase shifted optical signal, where the first waveguide phase shifter, the first polarization rotator, and the second waveguide phase shifter are integrated on a single substrate.

An embodiment method of optical phase shifting includes receiving a first received optical signal and shifting, by a first waveguide phase shifter, a phase of a TE polarized component of the first received optical signal by a first phase shift to produce a TE polarized component of a first phase shifted optical signal. The method also includes shifting, by the first waveguide phase shifter, a phase of a TM polarized component of the first received optical signal by a second phase shift to produce a TM polarized component of the first phase shifted optical signal and rotating, by a first polarization rotator, the TE polarized component of the first phase shifted optical signal to produce a TM polarized component of a first rotated optical signal. Additionally, the method includes rotating, by the first polarization rotator, the TM polarized component of the first phase shifted optical signal to produce a TE polarized component of the first rotated optical signal and shifting, by a second waveguide phase shifter, a phase of the TM polarized component of the first rotated optical signal by a third phase shift to produce a TM polarized component of a second phase shifted optical signal. Also, the method includes shifting, by the second waveguide phase shifter, a phase of the TE polarized component of the first rotated optical signal by a fourth phase shift to produce a TE polarized component of the second phase shifted optical signal, where the first waveguide phase shifter, the first polarization rotator, and the second waveguide phase shifter are integrated on a single substrate.

An embodiment Mach-Zehnder interferometer includes an optical splitter including a first output port and a second output port. The Mach-Zehnder interferometer also includes a first leg optically coupled to the first output port of the optical splitter, where the first leg includes first waveguide phase shifter, a second waveguide phase shifter, and a first polarization rotator optically coupled between the first waveguide phase shifter and the second waveguide phase shifter. Additionally, the Mach-Zehnder interferometer includes a second leg optically coupled to the second output port of the optical splitter and an optical combiner including a first input port optically coupled to the first leg and a second input port optically coupled to the second leg, where the first leg and the second leg are integrated on a substrate.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
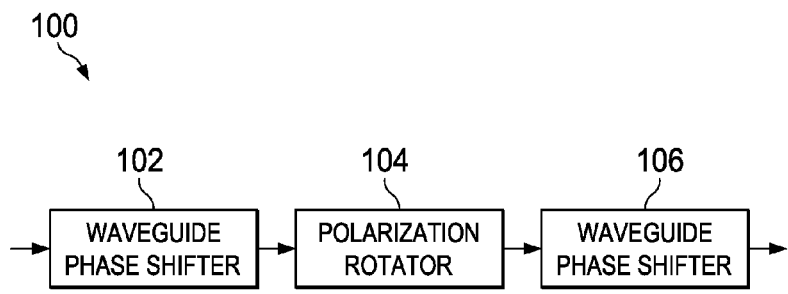
FIG. 1 illustrates an embodiment optical phase shifter.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An optical signal may be viewed as a propagating oscillating electric field orthogonal to an oscillating magnetic field at an optical frequency. The polarization of the optical field is indicated by the direction of the electric field vector. Propagating light may be decomposed into transverse electric (TE) polarization and transverse magnetic (TM) polarization. For TE polarized light, the electrical fields are orthogonal to the plane of propagation. For TM polarized light, the magnetic field is orthogonal to the direction of propagation.

Many optical components are affected by the polarization of the optical signal. For example, polarization mode dispersion (PMD), polarization dependent loss (PDL), and polarization dependent wavelength characteristics (PDlambda) may occur, especially when a highly birefringent material is used. Silicon waveguides may have a high geometrical birefringence. Silicon is useful for PICs because of its high index of refraction and its compatibility with electronic integrated circuit fabrication methods. In a birefringent material, the refractive index depends on the polarization of an optical signal. The magnitude of a phase shift depends on the confinement factor and effective index, which differs for TE and TM modes in a waveguide. The phase shift is given by:

$$\theta = \frac{2\pi}{\lambda} \Gamma \Delta n L_p, \text{ or}$$

$$\theta = \frac{2\pi}{\lambda} \eta_{\textit{eff}} \Delta L_p$$

where $\lambda$ is the wavelength, $\Gamma$ is the confinement factor, $n_{\textit{eff}}$ is the effective refractive index for the polarization, $\Delta n$ is the refractive index change induced into the waveguide, $L_p$ is the length of the device, and $\Delta L_p$ is the change in length of the device.

Large silicon waveguides may be polarization agnostic. However, such large waveguides have a large bend radius, leading to a low density of components. Also, such specially designed waveguides may be extremely sensitive to wavelength, dimensional parameter variations, and material parameter variations, so production may be problematic. It is desirable to use very fine waveguides for a high density PIC with a large refractive index contrast between the core and the cladding. This facilitates very small device sizes, but has a high birefringence.

When both TE and TM polarizations normally exist in an optical waveguide, a polarization diversity approach may be used. Polarization splitters split the optical signal to two separate paths based on polarization, with TE polarized light propagating along one path and TM polarized light propagating along the other path. Processing is applied to both paths in separate circuits to obtain similar effects. The outputs of the separate circuits are then combined. However, this approach leads to the device size more than doubling. Also, such networks may be susceptible to temperature gradients between the separate circuits.

In another example, the orientation of the TE and TM polarizations is exchanged at the midpoint of a semiconductor waveguide section. A gap is introduced into the waveguide at the midpoint, which leads to additional insertion losses. A discrete polarization rotating component is inserted into the gap for rotating both polarization orientations by ninety degrees. For example, a thin polyimide half wave-plate may be inserted into the gap. Alternatively, a polarization splitting grating coupler is inserted into the gap. Also, the assembly, with a micron tolerance, is costly.

The phase of an optical signal may be adjusted by an optical phase shifter which adjusts the optical phase by propagating the optical signal along a desired optical path length. A phase shifter may be used for a variety of optical components. For example, phase modulators, intensity modulators, photonic switches, multiplexers, arrayed waveguide gratings, and demultiplexers may include an optical phase shifter.

FIG. 1 illustrates optical phase shifter 100. Initially, an optical signal enters optical phase shifter 100 at waveguide phase shifter 102. The entering optical signal contains both a TE polarized component and a TM polarization component. The optical path length of waveguide phase shifter 102 is approximately equal to half of the average length for the desired phase shift for the TE polarization and the TM polarization. For example, waveguide phase shifter 102 may be from about 100 µm to about 10 mm in length. In one example, waveguide phase shifter 102 is passive. In another example, waveguide phase shifter 102 is active, and the optical path length may be adjusted by applying a voltage, current, stress, and/or heat. The TE polarization mode and the TM polarization mode experience different phase shifts in the passive waveguide phase shifter 102, because waveguide phase shifter 102 is birefringent. The TE polarization mode and the TM polarization mode experience different phase shifts in the active waveguide phase shifter 102, because waveguide phase shifter 102 has different confinement factors for the different polarizations. In one example, waveguide phase shifter 102 is made of silicon. In other examples, waveguide phase shifter 102 is made of InP, or other birefringent materials, such as InGaAsP and AlGaAs.

The optical output of waveguide phase shifter 102 proceeds to polarization rotator 104, which rotates the polarization by ninety degrees. Thus, the TE polarization is converted to a TM polarization, and the TM polarization is converted to a TE polarization. Waveguide phase shifter 102 and polarization rotator 104 are integrated on a single substrate.

After the polarization has been rotated, the optical signal proceeds to waveguide phase shifter 106. Waveguide phase shifter 106 is similar to waveguide phase shifter 102. Thus, the optical path length and phase shift experienced by the TE polarization mode and the TM polarization mode are similar. In one example, the phase shift for waveguide phase shifter 102 is within $\pi/16$ of that of waveguide phase shifter 106. In other examples the phase shift of waveguide phase shifter 102 and waveguide phase shifter 106 are within $\pi/8$, $\pi/24$, $\pi/32$, $\pi/48$, or $\pi/64$. The original TE polarized light passes through waveguide phase shifter 102 as TE polarized and through waveguide phase shifter 106 as TM polarized light. Conversely, the original TM polarized light passes through waveguide phase shifter 102 as TM polarized and through waveguide phase shifter 106 as TE polarized light. Waveguide phase shifter 102, polarization rotator 104, and waveguide phase shifter 106 are integrated on a single substrate.

After waveguide phase shifter 106, there may be another ninety degree polarization rotator (not pictured). This additional phase rotator restores the optical signal to its original polarization state. The TE polarized light is converted to TM polarized light by the first polarization rotator, and back to TE polarized light by the second polarization rotator. Conversely, the TM polarized light is converted to TE polarized light by the first polarization rotator, and back to TM polarized light by the second polarization rotator.

Figure 2:
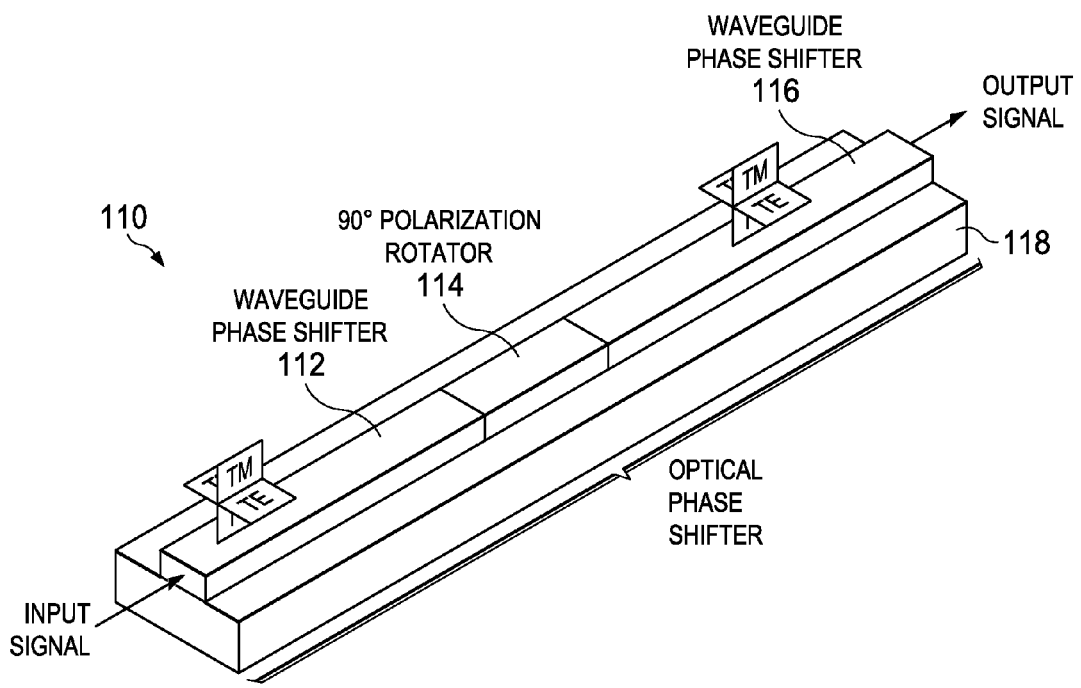
FIG. 2 illustrates another embodiment optical phase shifter.

FIG. 2 illustrates optical phase shifter 110. Optical phase shifter 110 is disposed on substrate 118, and may be a part of a PIC. Optical phase shifter 110 may be fabricated on silicon-on-insulator (SOI), where the waveguide layer is fabricated in the top silicon layer.

An input optical signal enters at waveguide phase shifter 112. Waveguide phase shifter 112 phase shifts the input optical signal by approximately half the desired phase shift for the average of the TE and TM polarizations. The TE and TM polarizations are phase shifted by different amounts. In one example, waveguide phase shifter 112 is a thermo-optical phase shifter. In another example, waveguide phase shifter 112 is an electro-optical phase shifter. Alternatively, waveguide phase shifter 112 is a passive phase shifter. A passive waveguide phase shifter may require a slightly longer length of the waveguide than that of the input and output, or may rely on a stressed cladding for index modification. Examples of materials that may be used for active phase shifters include doped silicon, a heater on silicon, and lithium niobate.

Then, the phase shifted light is polarization rotated by ninety degrees by polarization rotator 114. Thus, the TE polarization is transformed into a TM polarization, and the TM polarization is transformed to a TE polarization. Polarization rotator 114 is made of a highly birefringent material. The polarization rotator may be made from a birefringent crystal like lithium niobate. Alternatively, the polarization rotator is made from an asymmetrical waveguide, for example composed of silicon, or from an asymmetrical coupler.

Finally, the polarization rotated light proceeds to waveguide phase shifter 116, which is similar to waveguide phase shifter 112. After passing through waveguide phase shifter 112, polarization rotator 114, and waveguide phase shifter 116, both polarizations experience a similar total phase shift.

Figure 3:
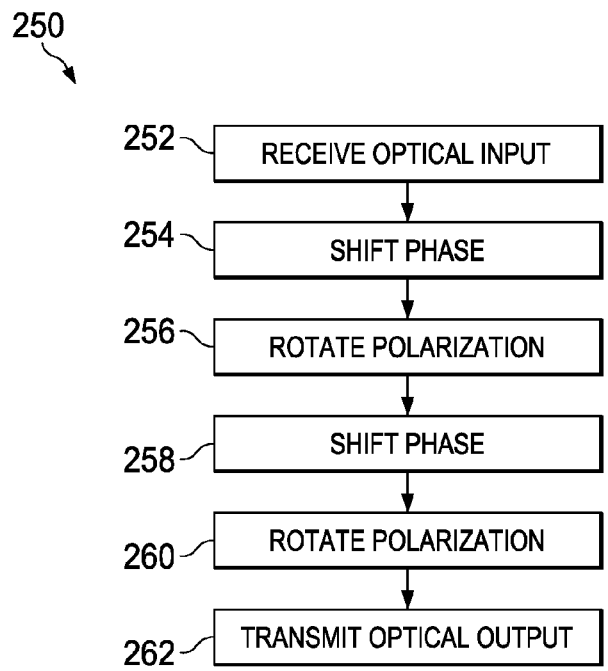
FIG. 3 illustrates a flowchart for an embodiment method of optical phase shifting.

FIG. 3 illustrates flowchart 250 for a method of phase shifting an optical signal. The TE polarization and the TM polarization are phase shifted by approximately the same amount. Initially, in step 252, the optical input is received. The optical input may be received from another portion of a PIC. Alternatively, the optical signal is received from an external component or another source. The input optical signal has a TE polarization mode and a TM polarization mode.

Then, in step 254, the light is phase shifted. For example, the light is phase shifted by approximately half of the average total desired phase shift for the TE polarization and the TM polarization. The phase shifting may be performed by an active or passive phase shifter Next, in step 256, the polarization of the phase shifted light is rotated by ninety degrees. The TE polarization is converted to a TM polarization, and the TM polarization is converted to a TE polarization.

The polarization rotated light is then phase shifted, in step 258, by a phase shifter similar to the one used in step 254. Thus, both polarizations of light are phase shifted by the same total amount, because they experience one phase shift as TE polarized light and the other similar phase shift as TM polarized light.

Optionally, in step 260, the light is again polarization rotated by ninety degrees. This restores the light to its original polarization, for applications that need the original polarization.

Finally, in step 262, the output light is transmitted. This may be done, for example, to another part of a PIC, another optical device, or externally coupled.

An embodiment optical phase shifter may improve polarization dependent loss performance. Also, an embodiment reduces the total insertion loss, facilitating the construction of large optical switches. An embodiment may lower thermal dependence due to inherent thermal compensation. In an embodiment, manufacturability is improved. For example, an embodiment may be fabricated on a wafer scale, for example in a CMOS silicon wafer environment. Additionally, in an embodiment, there is high power efficiency due to a reduced component count. An embodiment facilitates increased flexibility and scope of applications for PICs, because both TE and TM polarizations are processed in the same optical circuit.

Figure 4:
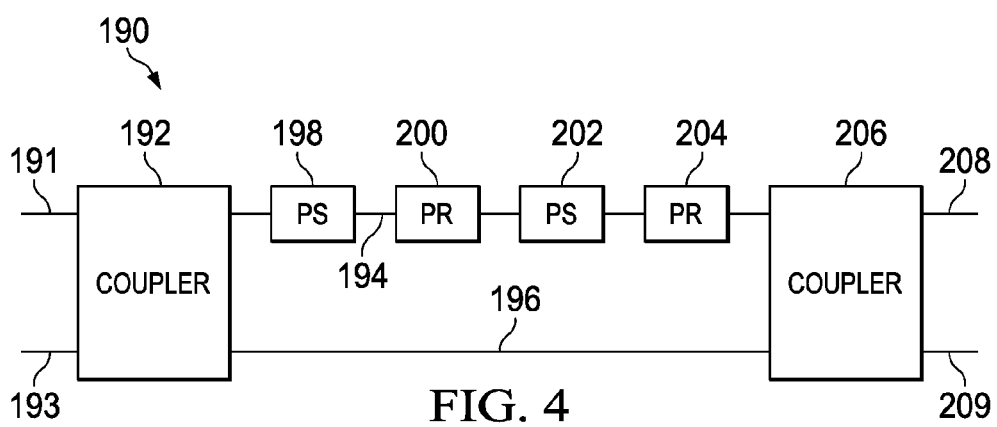
FIG. 4 illustrates an embodiment Mach-Zehnder interferometer.

FIG. 4 illustrates Mach-Zehnder interferometer (MZI) 190 containing a polarization insensitive phase shifter. A Mach-Zehnder interferometer may be used for switching in telecommunications, in example for high speed dense wavelength division multiplexing (DWDM). Incoming light enters input 191 or input 193, and proceeds to coupler 192, where it is split. Half of the optical signal is coupled to leg 194 and half of the optical signal is coupled to leg 196. The optical signals from legs 194 and 196 are combined by coupler 206, where it is output in output 208 or output 209. The output depends on the relative optical path lengths of leg 196 and leg 194. When the optical path lengths are the same, or have a difference in phase shift of a multiple of $2\pi$, between leg 194 and leg 196, there is complete constructive interference in leg 209. However, if the path lengths have a relative phase shift of $-\pi$, $\pi$, $3\pi$, etc., there is complete destructive interference in leg 209. For intermediate relative phase shifts, there is an intermediate interference. If the optical path lengths are varied, for example by introducing a variable phase shift into one or both legs, Mach-Zehnder interferometer 190 may be used as an optical switch. Mach-Zehnder interferometer 190 is integrated on a single substrate, for example on a PIC.

Leg 194 of Mach-Zehnder interferometer 190 contains a polarization insensitive phase shifter. An optical signal propagating in leg 194 initially is phase shifted by waveguide phase shifter 198, which shifts the optical phase by approximately half of the total desired phase shift. Then, the polarization is rotated by ninety degrees by polarization rotator 200. Next, the optical signal is phase shifted by waveguide phase shifter 202, similar to waveguide phase shifter 198. The TE and TM polarizations are phase shifted by the same amount, because both polarizations experience one phase shift as TE polarized light and the other phase shift as TM polarized light. Finally, the polarization is phase shifted by ninety degrees by polarization rotator 204. The second polarization rotator returns the optical output to its original polarization. This may be used if coupler 192 and coupler 206 are polarization sensitive. If the polarizations experienced by coupler 192 and coupler 206 are different, and they are polarization sensitive, the coupling effects will be different, and there will be noise, preventing complete destructive interference and complete constructive interference. To switch Mach-Zehnder interferometer 190, waveguide phase shifter 198 and waveguide phase shifter 202 may be adjusted, for example by applying a current, voltage, stressed cladding, or heat, to alter the phase shift between the optical signal propagating along leg 194 and the optical signal propagating along leg 196.

Figure 5:
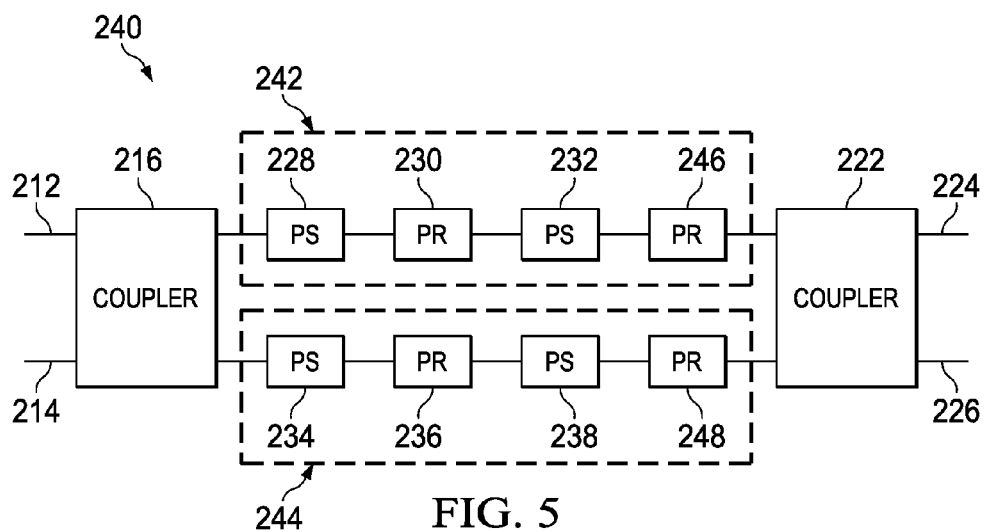
FIG. 5 illustrates another embodiment Mach-Zehnder interferometer.

FIG. 5 illustrates Mach-Zehnder interferometer 240, a mirrored Mach-Zehnder interferometer containing a polarization insensitive phase shifter in both legs. Mach-Zehnder interferometer 240 is integrated on a single substrate, such as an SOI substrate. As with Mach-Zehnder interferometer 190, an optical signal enters Mach-Zehnder interferometer 240 at input 212 or 214, and is split by coupler 216. Half the light is coupled to leg 242, and half the light is coupled to leg 244. The optical signals from the two legs are combined by coupler 222, and output to output 224 and/or output 226. Leg 242 contains waveguide phase shifter 228, polarization rotator 230, waveguide phase shifter 232, and polarization rotator 246. Leg 244 contains waveguide phase shifter 234, polarization rotator 236, waveguide phase shifter 238, and polarization rotator 248. One leg may contain active phase shifters while the other leg contains passive phase shifters, both legs may contain active phase shifters, or both legs may contain passive phase shifters. Incorporating phase shifters in both legs helps the legs have similar losses. Different losses in the two legs may lead to more crosstalk and may prevent complete constructive interference and complete destructive interference.

Figure 6:
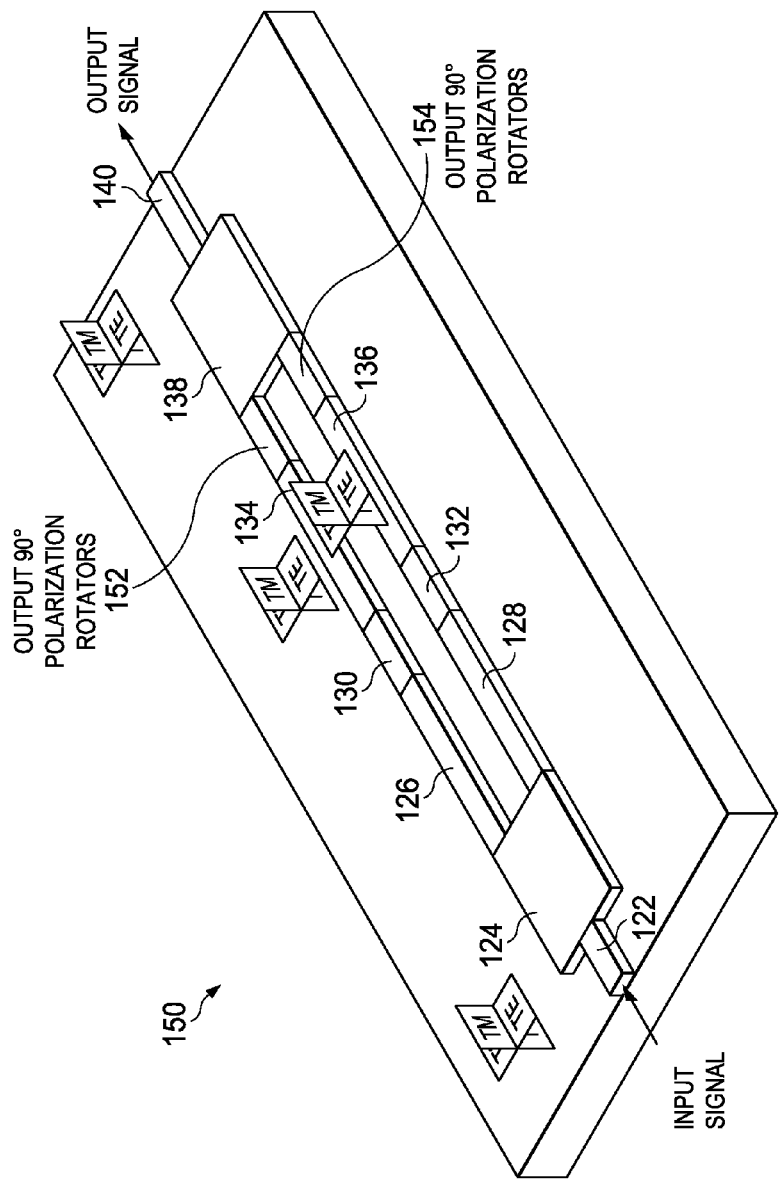
FIG. 6 illustrates an additional embodiment Mach-Zehnder interferometer.

FIG. 6 illustrates Mach-Zehnder interferometer 150, a mirrored Mach-Zehnder interferometer. An optical signal enters at input 122, and is split by coupler 124. The light is split into two legs. In one leg, the light passes through waveguide phase shifter 126, polarization rotator 130, waveguide phase shifter 134, and polarization rotator 152. In the other leg, light passes through waveguide phase shifter 128, polarization rotator 132, waveguide phase shifter 136, and polarization rotator 154. The optical signals are then combined by coupler 138 to output 140. In one example, Mach-Zehnder interferometer 150 is a push-pull configuration, where the light experiences a $\pi/2$ phase shift in one leg and a $-\pi/2$ phase shift in the other leg, leading to complete destructive interference. As long as the phase difference between the two legs is odd multiples of $\pi$ (e.g., $\pm\pi$, $\pm 3\pi$, etc).

Figure 7:
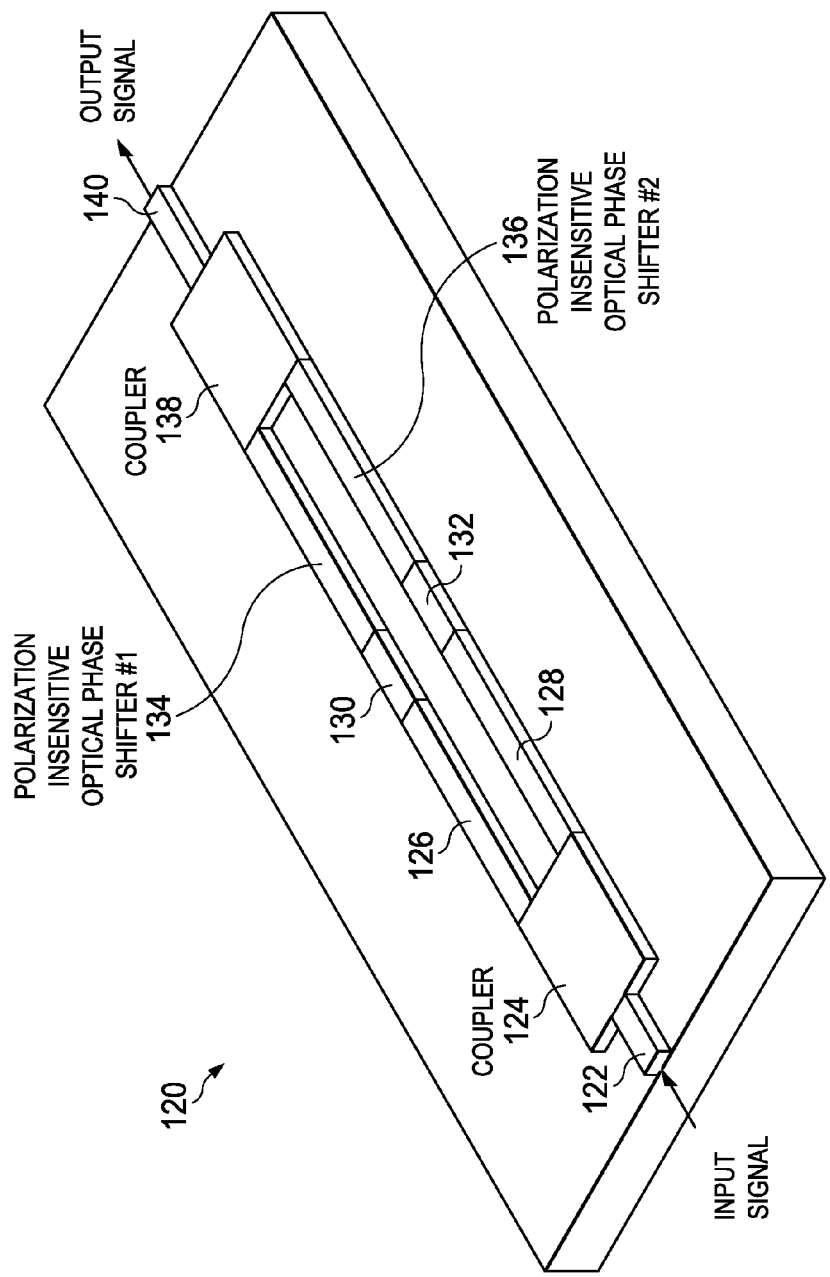
FIG. 7 illustrates another embodiment Mach-Zehnder interferometer.

FIG. 7 illustrates Mach-Zehnder interferometer 120, a mirrored Mach-Zehnder interferometer, where each leg contains only one polarization rotator. Mach-Zehnder interferometer 120 may be used when coupler 124 and coupler 138 are polarization insensitive. An optical signal enters in input 122, and is split by coupler 124. One leg contains waveguide phase shifter 126, polarization rotator 130, and waveguide phase shifter 134, while the other leg contains waveguide phase shifter 128, polarization rotator 132, and waveguide phase shifter 136. The optical signals from the two legs are combined in coupler 138 to output 140.

Figure 8:
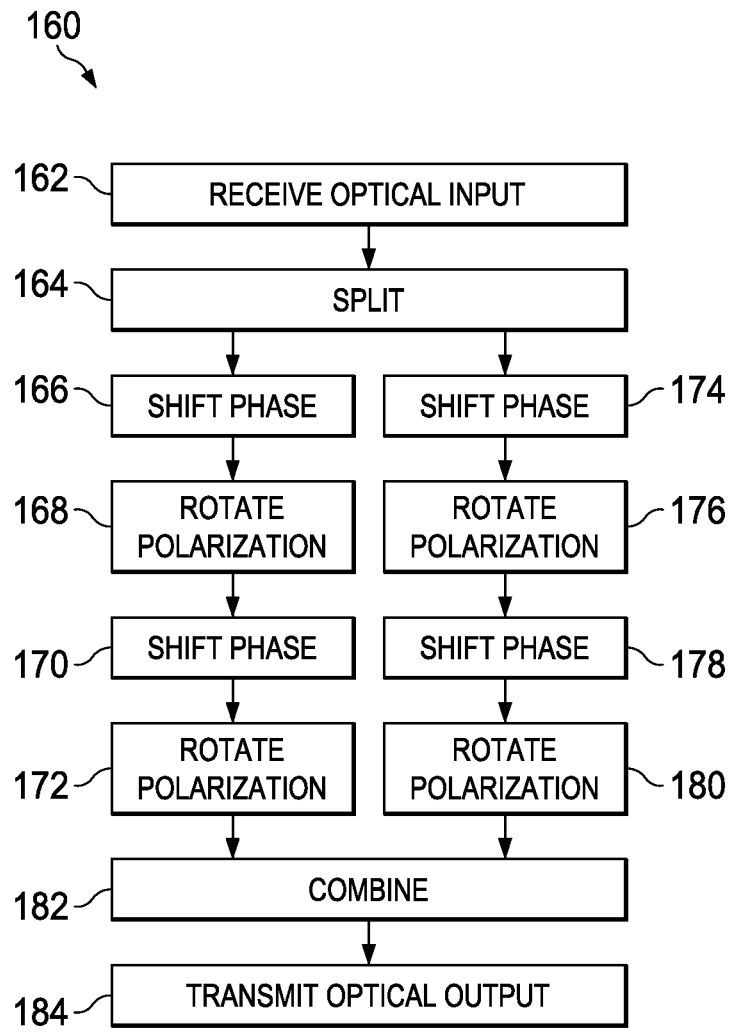
FIG. 8 illustrates a flowchart for an embodiment method of switching using a Mach-Zehnder interferometer.

FIG. 8 illustrates flowchart 160 for a method of switching optical signals using a Mach-Zehnder interferometer. Initially, in step 162, an optical input signal is received. The optical input signal may be received from another portion of a PIC, another optical component, or from an external source.

Then, in step 164, the optical input signal is split. One portion of the optical input signal goes to a first leg of a Mach-Zehnder interferometer, and proceeds to step 166. The other portion of the optical input signal goes to a second leg of the Mach-Zehnder interferometer, and proceeds to step 174. In one example, only one leg contains a phase shifter. In another example, both legs contain phase shifters.

In step 166 and step 174, the light in the two legs experiences a phase shift. The phase shift in the two legs may be the same, or it may be different. The phase shift in one or both legs may be adjustable. A phase shift may be adjusted by applying a voltage, current, stressed cladding, or heat to the phase shifter.

Next, in step 168 and step 176, the polarizations of the optical signals are in both legs are rotated by ninety degrees, exchanging the TE polarization and the TM polarization.

After rotating the polarizations, the optical signals are phase shifted again in step 170 and step 178. The phase shift achieved by step 170 is very close to the phase shift achieved by step 166. Likewise, the phase shift achieved by step 178 is very close to the phase shift achieved by step 174. Thus, the TE and TM polarizations are phase shifted by the same amount.

Optionally, the polarizations of the optical signals are rotated by an additional ninety degrees in step 172 and step 180 to return the light to its original polarization, so the polarization at the input coupler is the same as the polarization at the output coupler.

The optical signals from the two legs are combined in step 182. Depending on the relative phase shifts between optical signals propagating along the two legs, there may be complete destructive interference, complete constructive interference, or an intermediate amount of interference.

Finally, in step 184, the optical output is transmitted, for example to another portion of a PIC, another optical component, or externally.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical phase shifter comprising:
a first waveguide phase shifter configured to phase shift a transverse electric (TE) polarized component of an input optical signal by a first phase shift to produce a TE polarized component of a first phase shifted optical signal, and configured to phase shift a transverse magnetic (TM) polarized component of the input optical signal by a second phase shift to produce a TM polarized component of the first phase shifted optical signal;
a first polarization rotator configured to rotate the TE polarized component of the first phase shifted optical signal to produce a TM polarized component of a rotated optical signal, and configured to rotate the TM polarized component of the first phase shifted optical signal to produce a TE polarized component of the rotated optical signal; and
a second waveguide phase shifter configured to phase shift a TE polarized component of the rotated optical signal by a third phase shift to produce a TE polarized component of a second phase shifted optical signal, and configured to phase shift the TM polarized component of the rotated optical signal by a fourth phase shift to produce a TM polarized component of the second phase shifted optical signal, wherein the first waveguide phase shifter, the first polarization rotator, and the second waveguide phase shifter are integrated on a single substrate.

2. The optical phase shifter of claim 1, wherein the first phase shift plus the fourth phase shift is within n/16 of the second phase shift plus the third phase shift.

3. The optical phase shifter of claim 1, further comprising a second polarization rotator configured to rotate the TE polarized component of the second phase shifted optical signal to produce a TM polarized component of an output optical signal, and configured to rotate the TM polarized component of the second phase shifted optical signal to produce a TE polarized component of the output optical signal.

4. The optical phase shifter of claim 1, wherein the first waveguide phase shifter and the second waveguide phase shifter are passive waveguide phase shifters.

5. The optical phase shifter of claim 1, wherein the first waveguide phase shifter and the second waveguide phase shifter are active waveguide phase shifters.

6. The optical phase shifter of claim 5, wherein the first waveguide phase shift is configured to be adjusted by applying a voltage to the first waveguide phase shifter.

7. The optical phase shifter of claim 1, wherein the substrate comprises silicon-on-insulator (SOI).

8. A method of optical phase shifting, the method comprising:
receiving a first received optical signal;
shifting, by a first waveguide phase shifter, a phase of a TE polarized component of the first received optical signal by a first phase shift to produce a TE polarized component of a first phase shifted optical signal;
shifting, by the first waveguide phase shifter, a phase of a TM polarized component of the first received optical signal by a second phase shift to produce a TM polarized component of the first phase shifted optical signal;
rotating, by a first polarization rotator, the TE polarized component of the first phase shifted optical signal to produce a TM polarized component of a first rotated optical signal;
rotating, by the first polarization rotator, the TM polarized component of the first phase shifted optical signal to produce a TE polarized component of the first rotated optical signal;
shifting, by a second waveguide phase shifter, a phase of the TM polarized component of the first rotated optical signal by a third phase shift to produce a TM polarized component of a second phase shifted optical signal; and
shifting, by the second waveguide phase shifter, a phase of the TE polarized component of the first rotated optical signal by a fourth phase shift to produce a TE polarized component of the second phase shifted optical signal, wherein the first waveguide phase shifter, the first polarization rotator, and the second waveguide phase shifter are integrated on a single substrate.

9. The method of claim 8, further comprising:
rotating the TE polarized component of the second phase shifted optical signal to produce a TM polarized component of a second rotated optical signal; and
rotating the TM polarized component of the second phase shifted optical signal to produce a TE polarized component of the second rotated optical signal.

10. The method of claim 8, further comprising adjusting the first phase shift and the second phase shift.

11. The method of claim 10, wherein adjusting the first phase shift and the second phase shift comprises applying a voltage to the first waveguide phase shifter.

12. The method of claim 8, further comprising:
splitting a first input optical signal to produce the first received optical signal and a second received optical signal;
transmitting the second received optical signal to produce a transmitted optical signal; and
combining the second phase shifted optical signal and the transmitted optical signal.

13. The method of claim 12, wherein transmitting the second received optical signal comprises:
shifting a phase of a TE polarized component of the second received optical signal to produce a TE polarized component of a third phase shifted optical signal;
shifting a phase of a TM polarized component of the second received optical signal to produce a TM polarized component of the third phase shifted optical signal;
rotating the TE polarized component of the third phase shifted optical signal to produce a TM polarized component of a third rotated optical signal;
rotating the TM polarized component of the third phase shifted optical signal to produce a TE polarized component of the third rotated optical signal;
shifting a phase of the TM polarized component of the third rotated optical signal to produce a TM polarized component of the transmitted optical signal; and
shifting a phase of the TE polarized component of the third rotated optical signal to produce a TE polarized component of the transmitted optical signal.

14. The method of claim 12, wherein transmitting the second received optical signal comprises:
shifting a phase of a TE polarized component of the second received optical signal to produce a TE polarized component of a third phase shifted optical signal;
shifting a phase of a TM polarized component of the second received optical signal to produce a TM polarized component of the third phase shifted optical signal;
rotating the TE polarized component of the third phase shifted optical signal to produce a TM polarized component of a third rotated optical signal;
rotating the TM polarized component of the third phase shifted optical signal to produce a TE polarized component of the third rotated optical signal;

shifting a phase of the TM polarized component of the third rotated optical signal to produce a TM polarized component of a fourth phase shifted optical signal;

shifting a phase of the TE polarized component of the third rotated optical signal to produce a TE polarized component of the fourth phase shifted optical signal;

rotating the TM polarized component of the fourth phase shifted optical signal to produce a TE polarized component of the transmitted optical signal; and rotating the TE polarized component of the fourth phase shifted optical signal to produce a TM polarized component of the transmitted optical signal.

15. A Mach-Zehnder interferometer comprising:

an optical splitter comprising
- a first output port, and
- a second output port;

a first leg optically coupled to the first output port of the optical splitter, wherein the first leg comprises
- a first waveguide phase shifter,
- a second waveguide phase shifter, and
- a first polarization rotator optically coupled between the first waveguide phase shifter and the second waveguide phase shifter;

a second leg optically coupled to the second output port of the optical splitter; and an optical combiner comprising
- a first input port optically coupled to the first leg, and
- a second input port optically coupled to the second leg, wherein the first leg and the second leg are integrated on a substrate.

16. The Mach-Zehnder interferometer of claim 15, wherein the first leg further comprises a third polarization rotator optically coupled to the second phase shifting waveguide.

17. The Mach-Zehnder interferometer of claim 15, wherein the second leg comprises:
- a third waveguide phase shifter;
- a fourth waveguide phase shifter; and
- a second polarization rotator optically coupled between the third waveguide phase shifter and the fourth waveguide phase shifter.

18. The Mach-Zehnder interferometer of claim 17, wherein the first leg further comprises a third polarization rotator optically coupled to the second phase shifting waveguide, and wherein the second leg further comprises a fourth polarization rotator optically coupled to the fourth phase shifting waveguide.

19. The Mach-Zehnder interferometer of claim 15, wherein the substrate is a silicon-on-insulator (SOI) substrate.

20. The Mach-Zehnder interferometer of claim 15, wherein the first waveguide phase shifter and the second waveguide phase shifter are active waveguide phase shifters.

* * * * *